(12) United States Patent
Yagi et al.

(10) Patent No.: US 7,924,382 B2
(45) Date of Patent: Apr. 12, 2011

(54) LIQUID CRYSTAL DISPLAY DEVICE SUBSTRATE, METHOD OF MANUFACTURING LIQUID CRYSTAL DISPLAY DEVICE SUBSTRATE, LIQUID CRYSTAL DISPLAY DEVICE AND METHOD OF MANUFACTURING LIQUID CRYSTAL DISPLAY DEVICE

(75) Inventors: Toshifumi Yagi, Tsu (JP); Toshihide Tsubata, Tsu (JP); Yoshinori Shimada, Taki-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 575 days.

(21) Appl. No.: 11/915,166

(22) PCT Filed: May 12, 2006

(86) PCT No.: PCT/JP2006/309549
§ 371 (c)(1),
(2), (4) Date: Nov. 21, 2007

(87) PCT Pub. No.: WO2006/126405
PCT Pub. Date: Nov. 30, 2006

(65) Prior Publication Data
US 2009/0073361 A1    Mar. 19, 2009

(30) Foreign Application Priority Data
May 25, 2005   (JP) .................. 2005-152725

(51) Int. Cl.
*G02F 1/1337*   (2006.01)
*G02F 1/1343*   (2006.01)

(52) U.S. Cl. .................................... 349/129; 349/143
(58) Field of Classification Search .............. 349/129
See application file for complete search history.

(56) References Cited

U.S. PATENT DOCUMENTS

| | | | |
|---|---|---|---|
| 6,573,965 B1 * | 6/2003 | Liu et al. .................. | 349/129 |
| 6,645,603 B2 * | 11/2003 | Koyama et al. ............ | 428/167 |
| 6,657,695 B1 | 12/2003 | Song et al. | |
| 6,661,488 B1 | 12/2003 | Takeda et al. | |
| 6,724,452 B1 | 4/2004 | Takeda et al. | |
| 6,738,120 B1 | 5/2004 | Song et al. | |
| 6,828,069 B1 | 12/2004 | Nakazawa et al. | |

(Continued)

FOREIGN PATENT DOCUMENTS

JP       05-72528 A       3/1993

(Continued)

OTHER PUBLICATIONS

Official communication issued in the International Application No. PCT/JP2006/309549, mailed on Aug. 1, 2006.

*Primary Examiner* — Wen-Ying P Chen
(74) *Attorney, Agent, or Firm* — Keating & Bennett, LLP

(57) ABSTRACT

A color filter substrate for a liquid crystal display device includes a color layer, a photo spacer and a counter electrode disposed on the substrate, and an alignment control protrusion is disposed on the counter electrode for controlling alignment of liquid crystal. A manufacturing method for the color filter substrate includes the step of forming an opening by laser irradiation in a region of the counter electrode corresponding to an absent portion occurring in the alignment control protrusion. The manufacturing method is also applicable to an active matrix substrate for a liquid crystal display device. The manufacturing method can effectively correct a defect if one occurs in the alignment control protrusion.

12 Claims, 17 Drawing Sheets

U.S. PATENT DOCUMENTS

| | | |
|---|---|---|
| 6,894,753 B2 | 5/2005 | Song et al. |
| 6,952,247 B2 | 10/2005 | Song et al. |
| 7,046,322 B2 * | 5/2006 | Tsuchiya ..................... 349/114 |
| 7,110,078 B2 | 9/2006 | Song et al. |
| 7,154,577 B2 | 12/2006 | Song et al. |
| 7,167,224 B1 | 1/2007 | Takeda et al. |
| 7,224,421 B1 | 5/2007 | Takeda et al. |
| 7,227,606 B2 | 6/2007 | Takeda et al. |
| 2002/0063844 A1 * | 5/2002 | Matsuura et al. ............. 349/187 |
| 2003/0058374 A1 * | 3/2003 | Takeda et al. .................. 349/33 |
| 2004/0090581 A1 | 5/2004 | Song et al. |
| 2004/0119923 A1 * | 6/2004 | Lee et al. ...................... 349/129 |
| 2005/0162599 A1 | 7/2005 | Kurihara et al. |
| 2006/0274251 A1 | 12/2006 | Song et al. |
| 2007/0064187 A1 | 3/2007 | Takeda et al. |
| 2007/0081116 A1 | 4/2007 | Song et al. |

FOREIGN PATENT DOCUMENTS

| | | |
|---|---|---|
| JP | 11-271752 A | 10/1999 |
| JP | 2000-331610 A | 11/2000 |
| JP | 2002-082217 A | 3/2002 |
| JP | 2003-273114 A | 9/2003 |
| JP | 2004-093654 A | 3/2004 |
| JP | 2005-017486 A | 1/2005 |
| JP | 2005-300940 A | 10/2005 |
| JP | 2005-321494 A | 11/2005 |

* cited by examiner

LIQUID CRYSTAL DISPLAY DEVICE SUBSTRATE, METHOD OF MANUFACTURING LIQUID CRYSTAL DISPLAY DEVICE SUBSTRATE, LIQUID CRYSTAL DISPLAY DEVICE AND METHOD OF MANUFACTURING LIQUID CRYSTAL DISPLAY DEVICE

BACKGROUND OF THE INVENTION

1. Field of the Invention

The present invention relates to a substrate for a liquid crystal display device, a method of manufacturing a substrate for a liquid crystal display device, a liquid crystal display device and a method of manufacturing a liquid crystal display device. In particular, the present invention relates to correction of a defect in a liquid crystal display device substrate having a protrusion provided on an electrode for controlling alignment of the liquid crystal in order to increase the viewing angle.

2. Description of Related Art

A liquid crystal display device generally includes a structure having a liquid crystal sandwiched between a first substrate (referred to as "color filter substrate") including a counter electrode and a color filter, for example, and a second substrate (referred to as "TFT substrate" or "active matrix substrate") including a switching element such as TFT (Thin Film Transistor) and a pixel electrode, for example. The liquid crystal display device displays an image by applying a potential between the pixel electrode and the counter electrode to generate an electric field between these substrates and thereby control alignment of liquid crystal molecules by the electric field, and adjusting the amount of transmitted light from a backlight, for example, by controlling the alignment.

The liquid crystal display device has advantages such as thinness, lightweight and low power consumption, and has been used widely for electronic devices such as a monitor of a personal computer, a television receiver and a mobile phone. Regarding a liquid crystal display device having a relatively large screen size like those used for a monitor and a television receiver, vertical alignment (VA) mode with multiple domains (multi-domain) which is excellent in display quality such as luminance, contrast ratio and viewing angle characteristic, namely so-called MVA (Multi-domain Vertical Alignment) mode has become widespread. This is shown for example in Japanese Patent Laying-Open Nos. 2001-083523, 2001-021894 and 2001-109009.

The MVA mode provides a cut-out pattern (electrode opening) and a protrusion for controlling alignment of liquid crystal molecules (hereinafter referred to as "alignment control protrusion") to the pixel electrode of the active matrix substrate and the counter electrode of the color filter substrate. The MVA mode uses a fringe field formed by the cut-out pattern and the alignment control protrusion and tilted alignment of the liquid crystal at the tilted portion of the alignment control protrusion so as to align liquid crystal molecules in a plurality of different directions within a pixel and to thereby increase the viewing angle.

Regarding the MVA mode liquid crystal display device having excellent display quality, there is a demand for a lower price. Various methods are being studied for reducing the price particularly by improving the manufacturing yield and reducing the manufacturing cost of the color filter substrate and the active matrix substrate which are components of the liquid crystal display device.

FIG. 13 is a plan view of one pixel of an active matrix substrate used for a conventional MVA mode liquid crystal display device. As shown in FIG. 13, the active matrix substrate has a plurality of pixel electrodes 51 arranged in a matrix form. In FIG. 13, the outline of pixel electrode 51 is indicated by a bold solid line. On each pixel electrode 51, an alignment control protrusion 58 is provided for implementing divided alignment of the liquid crystal. A scan signal line 52 for applying a scan signal and a data signal line 53 for applying a data signal are arranged to extend around each pixel electrode 51 and cross each other. In the vicinity of the portion where scan signal line 52 and data signal line 53 cross each other, a TFT 54 is provided as a switching element connected to pixel electrode 51. TFT 54 has its gate electrode connected to scan signal line 52 and a scan signal which is input to the gate electrode controls drive of TFT 54. Further, TFT 54 has its source electrode connected to data signal line 53, and a data signal is input to the source electrode of TFT 54. TFT 54 has its drain electrode connected to a drain lead line 55. The drain electrode of TFT 54 is further connected to an upper hold-capacitor electrode 55a via drain lead line 55, and to pixel electrode 51 via a contact hole 56. Upper hold-capacitor electrode 55a is one of two electrodes which are components of a hold capacitor element. A hold capacitor line (also referred to as "common hold-capacitor line") 57 functions as the other electrode (lower hold-capacitor electrode) of the hold capacitor element.

FIG. 14 is a cross section along line XIV-XIV indicated by the arrow on the plan view of one pixel of the active matrix substrate shown in FIG. 13. As shown in FIG. 14, on a transparent and electrically insulating substrate 61 made of glass, plastic or the like, TFT 54 already shown in FIG. 13 is provided. TFT 54 includes gate electrode 62 and gate electrode 62 is connected to scan signal line 52 shown in FIG. 13. Scan signal line 52 and gate electrode 62 are produced by depositing a film made of a metal such as titanium, chromium, aluminum or molybdenum or depositing a film of an alloy of these metals or depositing a stacked film of these metals to a thickness of 1000 to 3000 angstroms by the well-known sputtering and patterning the film by the well-known photolithography. Hold capacitor line 57 functioning as the lower hold-capacitor electrode is formed in the same process step and made of the same material as scan signal line 52 and gate electrode 62.

A gate insulating film 63 (see FIG. 14) is provided on the whole substrate to cover gate electrode 62, scan signal line 52 and hold capacitor line 57. Gate insulating film 63 is formed of an electrically insulating film such as silicon nitride, silicon oxide or metal oxide film. On gate insulating film 63, a high-resistance semiconductor layer 64 made of amorphous silicon or polysilicon, for example, is arranged to overlap gate electrode 62. Further, on high-resistance semiconductor layer 64, a low-resistance semiconductor layer to be used as source electrode 65a and drain electrode 65b is provided as an ohmic contact layer. The low-resistance semiconductor layer is made of n+ amorphous silicon that is amorphous silicon doped with impurities such as phosphorus.

The insulating film and such films as amorphous silicon, polysilicon and n+ amorphous silicon films, for example, are deposited by the well-known plasma CVD (Chemical Vapor Deposition) for example and patterned by the well-known photolithography for example. The thickness of the gate insulating film may be 3000 to 4000 angstroms in the case where the film is a silicon nitride film, and the thickness of the high-resistance semiconductor layer may be approximately 1500 to 2500 angstroms in the case where the layer is an amorphous silicon film. The low-resistance semiconductor layer may be approximately 300 to 500 angstroms in thickness in the case where the layer is an n+ amorphous silicon film.

A data signal line 53 is formed to be connected to source electrode 65a. Drain lead line 55 and upper hold-capacitor electrode 55a are arranged to be connected to drain electrode 65b. Upper hold-capacitor electrode 55a is connected to pixel electrode 51 via contact hole 56 passing through an interlayer insulating film 67. Data signal line 53, drain lead line 55 and upper hold-capacitor electrode 55a are formed in the same process step. Data signal line 33, drain lead line 55 and upper hold-capacitor electrode 55a are produced by depositing a metal film such as titanium, chromium, aluminum, molybdenum, tantalum, tungsten or copper, a film of an alloy of these metals or a stacked film of these metals by the well-known sputtering for example to a thickness of 1000 to 3000 angstroms and patterning the film into a required shape by the well-known photolithography for example. TFT 54 is formed by performing channel etching by means of dry etching performed on the amorphous silicon film serving as the above-described high-resistance semiconductor layer and the n+ amorphous silicon film serving as the low-resistance semiconductor layer, using the pattern of data signal line 53 and drain lead line 55 as a mask.

Interlayer insulating film 67 is a resin film made of a photosensitive acrylic resin, for example, an inorganic insulating film made of silicon nitride or silicon oxide for example, or a stacked film of them. For example, a stacked film of a double layer structure is used that includes a silicon nitride film of 2000 angstroms in thickness deposited by the plasma CVD for example and a photosensitive acrylic resin film of 30000 angstroms in thickness formed by die coating (application) on the silicon nitride film.

Contact hole 56 extends through interlayer insulating film 67 formed to cover TFT 54, scan signal line 52, data signal line 53 and drain lead line 55. Contact hole 56 is formed, for example, by pattering the photosensitive acrylic resin film by the well-known photolithography (exposure and development) and etching the silicon nitride film by the well-known dry etching using the patterned photosensitive acrylic resin film as a mask.

Pixel electrode 51 is formed at an upper level of interlayer insulating film 67. Pixel electrode 51 is formed, for example, by depositing a transparent and electrically conductive film such as ITO (Indium Tin Oxide), IZO (Indium Zinc Oxide), zinc oxide or tin oxide for example, or a film of an alloy of them or a stacked film thereof by the sputtering, for example, to an approximately 500 to 2000 angstroms in thickness and patterning the film into a required shape by the well-known photolithography, for example.

On pixel electrode 51, alignment control protrusion 58 is formed as shown in FIGS. 13 and 14. Alignment control protrusion 58 is formed by applying a liquid resin onto the substrate by the well-known spin coat for example and patterning it through exposure, development and baking. The liquid resin may be phenol-novolac positive resist, liquid photosensitive acrylic resin or liquid photosensitive epoxy resin, for example. Alignment control protrusion 58 is formed with a film thickness (height) of 0.5 to 2.0 μm.

As shown in FIG. 13, alignment control protrusion 58 includes a main alignment control protrusion 58a and an auxiliary alignment control protrusion 58b (also referred to as "auxiliary rib," "auxiliary protrusion"). Auxiliary alignment control protrusion 58b is disposed to overlap the upper side, lower side, right side or left side of pixel electrode 51 of the active matrix substrate. Auxiliary alignment control protrusion 58b is formed to extend from an end of main alignment control protrusion 58a. Auxiliary alignment control protrusion 58b is provided in order to help the divided alignment of liquid crystal molecules in the vicinity of the end of main alignment control protrusion 58a and the end of pixel electrode 51 and suppress generation of an undesired domain.

"Domain" herein refers to one of regions separated by protrusions or slits or refers to the state of alignment of liquid crystal aligned in one of regions thus separated. An undesired domain (hereinafter referred to as "undesired domain") refers to a state where liquid crystal molecules are not in a desired state or not aligned in a desired direction in a boundary portion of the region and thus are aligned in various directions or aligned in an uncontrollable state, namely refers to an abnormal alignment state or a region where such an abnormal alignment state occurs.

Since auxiliary alignment control protrusion 58b is disposed to overlap the upper side, lower side, right side or left side of pixel electrode 51, it is disposed in a different direction from the direction in which main alignment control protrusion 58a is disposed. As a result, the alignment direction of liquid crystal molecules in the vicinity of auxiliary alignment control protrusion 58b is different from the direction of the divided alignment by main alignment control protrusion 58a. Therefore, liquid crystal molecules in the vicinity of auxiliary alignment control protrusion 58b make a relatively low contribution to the transmittance of the liquid crystal display device.

In order to suppress generation of an undesired domain and prevent decrease of the transmittance, auxiliary alignment control protrusion 58b is usually formed with the same or a smaller width as or than that of main alignment control protrusion 58a. This is for the purpose of providing the auxiliary alignment control protrusion with a smaller alignment regulating force than that of main alignment control protrusion 58a.

FIG. 15 is a plan view of a color filter substrate used for a conventional MVA mode liquid crystal display device. FIG. 16 is a cross section along line XVI-XVI indicated by the arrow in FIG. 15. In FIGS. 15 and 16, the color filter substrate has a transparent insulating substrate 71 of glass or plastic for example on which a colored layer 72 is formed that includes a plurality of color layers, for example, a red (R) layer 72a, a green (G) layer 72b, a blue (B) layer 72c, and a black matrix (BM) layer 72d.

Red (R) layer 72a, green (G) layer 72b, blue (B) layer 72c and black matrix (BM) layer 72d are formed in the following way. A resist solution (liquid resist) containing a pigment of each color is applied onto the substrate by the spin coat for example. Preparatory baking is performed to evaporate the solvent of the resist solution. The color layer film is thus formed on the substrate. A photomask is used to perform exposure and development and accordingly each color layer is patterned. The thickness of each color layer is usually 0.5 to 2.0 μm.

As shown in FIG. 16, a counter electrode 73 is formed on colored layer 72. Counter electrode 73 is formed for example by depositing a transparent and electrically conductive film of ITO (Indium Tin Oxide), IZO (Indium Zinc Oxide), zinc oxide, or tin oxide for example, or a film of an alloy of them or a stacked film of them by the well-known sputtering for example to a thickness of approximately 500 to 2000 angstroms and processing the film as required into a desired pattern by the well-known photolithography for example.

As shown in FIGS. 15 and 16, an alignment control protrusion 74 defining the divided alignment of liquid crystal, and a photo spacer 75 having the function of making contact with the active matrix substrate opposite to the color filter substrate to maintain a cell gap in the completed liquid crystal display device are provided on counter electrode 73.

Alignment control protrusion 74 and photo spacer 75 are formed by applying a liquid resin onto the substrate by the well-known spin coat, for example, and performing exposure, development and baking. As the liquid resin, phenol-novolac-based positive resist liquid, photosensitive acrylic resin liquid or photosensitive epoxy resin liquid for example is available. The alignment control protrusion is formed to a thickness of 0.5 to 2.0 μm, and photo spacer 75 is formed to a thickness of 2.0 to 5.0 μm.

Alignment control protrusion 74 includes a main alignment control protrusion 74a and an auxiliary alignment control protrusion 74b (also referred to as "auxiliary rib," "auxiliary protrusion"). Auxiliary alignment control protrusion 74b is disposed to overlap the upper side, lower side, right side or left side of black matrix layer 72d of the color filter substrate. Auxiliary alignment control protrusion 74b is usually formed to extend from an end of alignment control protrusion 74a. Auxiliary alignment control protrusion 74b is formed in order to help the divided alignment of liquid crystal molecules at the end of main alignment control protrusion 74a and suppress generation of an undesired domain.

Since auxiliary alignment control protrusion 74b is disposed to overlap the upper side, lower side, right side or left side of black matrix 72d, the auxiliary alignment control protrusion is disposed in a different direction from main alignment control protrusion 74a. As a result, the alignment direction of liquid crystal molecules near auxiliary alignment control protrusion 74b is different from the direction of the divided alignment defined by main alignment control protrusion 74a. Therefore, liquid crystal molecules near auxiliary alignment control protrusion 74b make a relatively low contribution to the transmittance of the liquid crystal display device.

In order to suppress generation of an undesired domain and prevent decrease of the transmittance, auxiliary alignment control protrusion 74b is usually formed with the same or a smaller width as or than that of main alignment control protrusion 74a. This is for the purpose of providing the auxiliary alignment control protrusion with a smaller alignment regulating force than that of main alignment control protrusion 74a.

FIG. 17 is a cross section schematically showing an example of the conventional MVA mode liquid crystal display device. Conventional MVA mode liquid crystal display device 84 is configured to have an active matrix substrate 81 and a color filter substrate 82 that have respective alignment films (not shown) made of polyimide, for example, for aligning liquid crystal at the surface and that are attached to each other with a sealing material (not shown) at the peripheral portion so that respective alignment films (not shown) are located opposite to each other. At this time, the distance between the substrates (also referred to as "cell gap") is kept constant by photo spacer 75. The portion between active matrix substrate 81 and color filter substrate 82 is filled with a liquid crystal forming a liquid crystal layer 83. A liquid crystal supply inlet is sealed with a sealing material (not shown). Alignment control protrusion 58 formed on pixel electrode 51 of active matrix substrate 81 and alignment control protrusion 74 formed on counter electrode 73 are disposed in a staggered configuration. With this configuration, liquid crystal molecules of liquid crystal layer 83 are arranged in the divided alignment form according to an applied potential.

The color filter substrate and the active matrix substrate are both liquid crystal display device substrates. As described above, the process of manufacturing an MVA mode liquid crystal display device substrate includes the step of forming an alignment control protrusion. In the step of forming the alignment control protrusion, such defects as partial absence of the alignment control protrusion and a remaining film of the alignment control protrusion could occur. In a pixel region where an absent portion or a remaining film portion of the alignment control protrusion occurs, the liquid crystal is not aligned normally. As a result, alignment failure or pixel defect (black spot or bright spot) occurs and the display quality deteriorates.

The alignment control protrusion is usually formed by patterning, using a liquid resist prepared by dissolving a phenol-novolac-type positive photosensitive resin in a solvent, applying the resist onto the substrate by the well-known spin coat and performing exposure and development. Alternatively, the alignment control protrusion may be formed by patterning, using, instead of the liquid resist, a dry film having a film-shaped support where a positive photosensitive resin film is formed, forming a resin film on the substrate by a thermal transfer process, and performing exposure and development on the resin film. Regardless of the manufacturing method, in this process of manufacturing, it is difficult to completely avoid the occurrence of such defects as absence and a remaining film of the alignment control protrusion due to dust on or scratches in the photomask which is used for exposure or foreign matter caught when the film is applied.

The auxiliary alignment control protrusion is usually formed with the same width as or a smaller width than that of the main alignment control protrusion in order to suppress generation of an undesired domain and prevent decrease of the transmittance. As described above, in the case where the positive photosensitive resin is used where an exposed portion is dissolved in a development solution, as the degree of exposure is larger, the pattern after development is likely to be thinner. Further, as compared with the negative photosensitive resin, the positive photosensitive resin is inferior in terms of adhesion to the substrate. Therefore, a thin auxiliary alignment control protrusion is more likely to become partially absent as compared with the main alignment control protrusion.

In the conventional practice, any substrate having a defect such as partial absence or a remaining film as described above was discarded as a defective product. Therefore, the manufacturing cost increases and the productivity decreases.

Some techniques concerning a method of correcting such defects as partial absence of a film and a remaining film have been disclosed. Japanese Patent Laying-Open No. 11-271752 discloses a method according to which ink for correction is dropped onto an absent portion of the film by the ink jet method. Japanese Patent Laying-Open No. 2003-273114 discloses a method according to which a photo CVD film is formed at an absent portion of the film. Japanese Patent Laying-Open No. 2000-331610 discloses a method of correcting partial absence of a barrier rib by applying a correction paste. Japanese Patent Laying-Open No. 2001-066418, Japanese Patent Laying-Open No. 2002-082217 and Japanese Patent Laying-Open No. 05-072528 disclose a method of removing a foreign matter or correcting the defect of a remaining film by irradiating the foreign matter or film-remaining defect with laser.

The above-described techniques are all related to a method of correcting a colored layer or counter electrode of a color filter substrate or a barrier rib of a plasma display, and they do not disclose a defect correction method for correcting an alignment control protrusion.

While techniques such as formation of a photo CVD film, dropping of correction ink and application of correction paste are disclosed regarding the partial absence of the film, the techniques all require another correcting material for correcting a defect in addition to materials used in a usual film-deposition process. Therefore, the efficiency of use of materials is low and development of a correction material is necessary.

SUMMARY OF THE INVENTION

In order to overcome the problems described above, preferred embodiments of the present invention provide a method of manufacturing a liquid crystal display device substrate and a method of manufacturing a liquid crystal display device according to which a defect, if one occurs at an alignment control protrusion provided on an electrode for increasing the viewing angle, can be corrected effectively. Furthermore, preferred embodiments of the present invention provide a liquid crystal display device substrate and a liquid crystal display device that normally function and operate even when a defect occurs at an alignment control protrusion on an electrode.

A method of manufacturing a liquid crystal display device substrate according to a preferred embodiment of the present invention is a method of manufacturing a liquid crystal display device substrate having an electrode formed to partially cover a main surface and including an alignment control protrusion arranged on the electrode so as to control alignment of liquid crystal, and the method includes the step of forming an opening in a region of the electrode that corresponds to an absent portion occurring in the alignment control protrusion.

In accordance with a preferred embodiment of the present invention, the alignment regulating force is exerted on a region near the opening that is almost identical to that of the tilted alignment of the liquid crystal at the tilted portion of the alignment control protrusion if it is normally present. Therefore, liquid crystal molecules can be aligned in a state close to the state where the alignment control protrusion is present. Therefore, when an image is displayed on the liquid crystal display device, alignment failure hardly occurs in a pixel having a partial absence of the alignment control protrusion. In other words, even if the alignment control protrusion provided on the electrode for increasing the viewing angle has a defect occurring therein, the defect can be corrected effectively.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

First Preferred Embodiment

Figure 1:
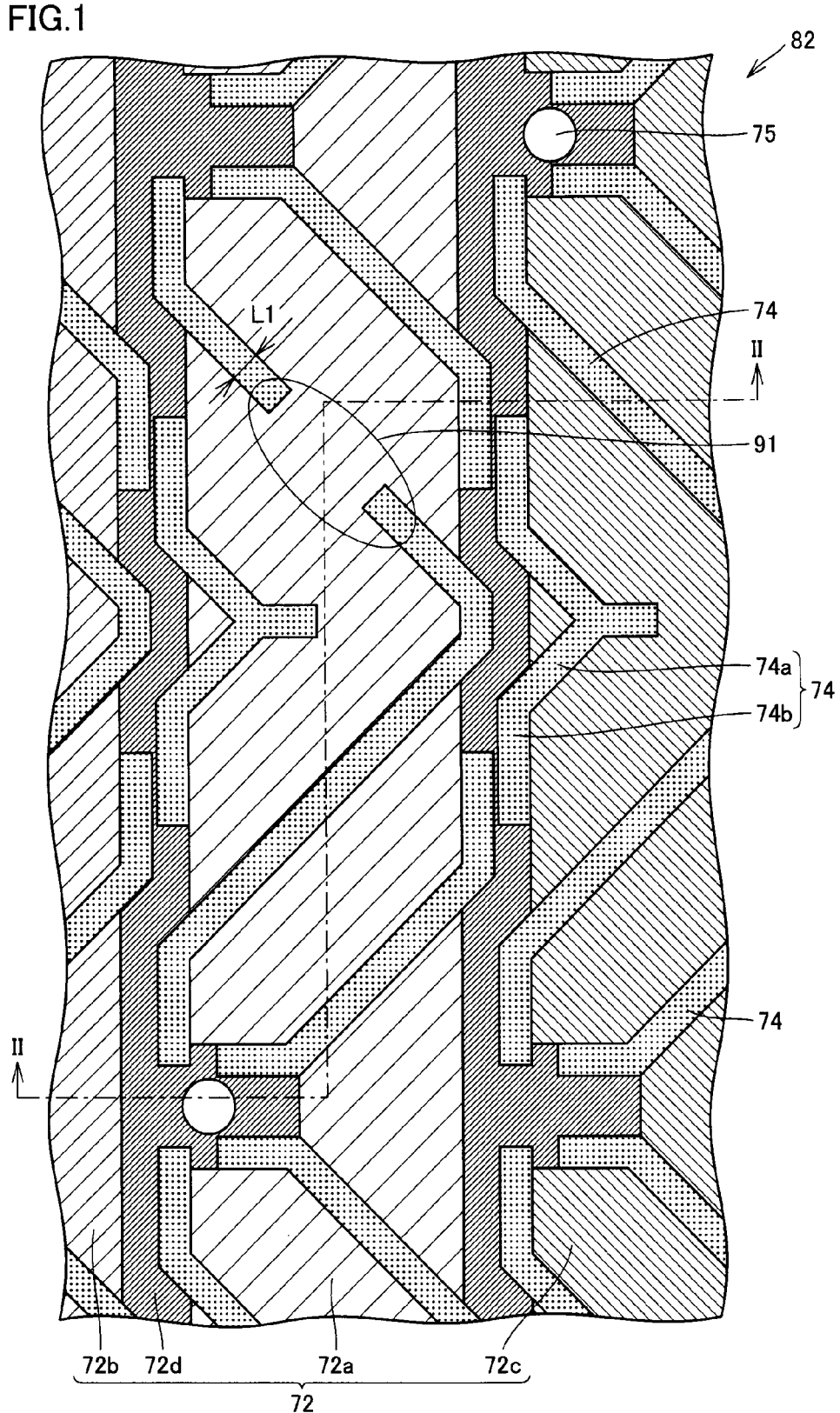
FIG. 1 is a partial plan view of a color filter substrate before defect correction according to a first preferred embodiment of the present invention.

Referring to FIGS. 1 to 4, a description will be given of a method of manufacturing a substrate for a liquid crystal display device according to a first preferred embodiment of the present invention. Regarding the present preferred embodiment, the description will be given of a method of manufacturing a color filter substrate as an example. FIG. 1 shows a plan view of color filter substrate 82 before defect correction. At a surface of color filter substrate 82, a colored layer 72 including a plurality of color layers, for example as shown in FIG. 1, a red (R) layer 72a, a green (G) layer 72b, a blue (B) layer 72c and a black matrix (BM) layer 72d is formed. At an upper surface of colored layer 72, an alignment control protrusion 74 is disposed. At a predetermined portion of black matrix layer 72d, a photo spacer 75 is disposed.

The black matrix on the color filter substrate has the function of preventing mixture of the colors and preventing leakage of light at and around a gap between pixel electrodes provided on an active matrix substrate disposed opposite to the color filter substrate as well as the function of preventing a malfunction by shielding a TFT element from outside light. The display contrast of the liquid crystal display device is improved by preventing leakage of light by the black matrix. Therefore, the black matrix is formed in a matrix shape or stripe shape so that the black matrix is located opposite to a gap between pixel electrodes and the TFT element when the active matrix substrate and the color filter substrate are disposed opposite to each other. The black matrix may be formed, for example, by depositing on the substrate a black photosensitive resin produced by dispersing carbon microparticles in a photosensitive resin or a photosensitive resin colored with dyes or pigments of a plurality of colors such as red and blue, by spin coating or slit coating, for example, and patterning the deposited resin by the photolithography. Alternatively, a film of low-reflection metal such as chromium or molybdenum may be deposited by the sputtering and the film may be patterned by the photolithography.

Figure 2:
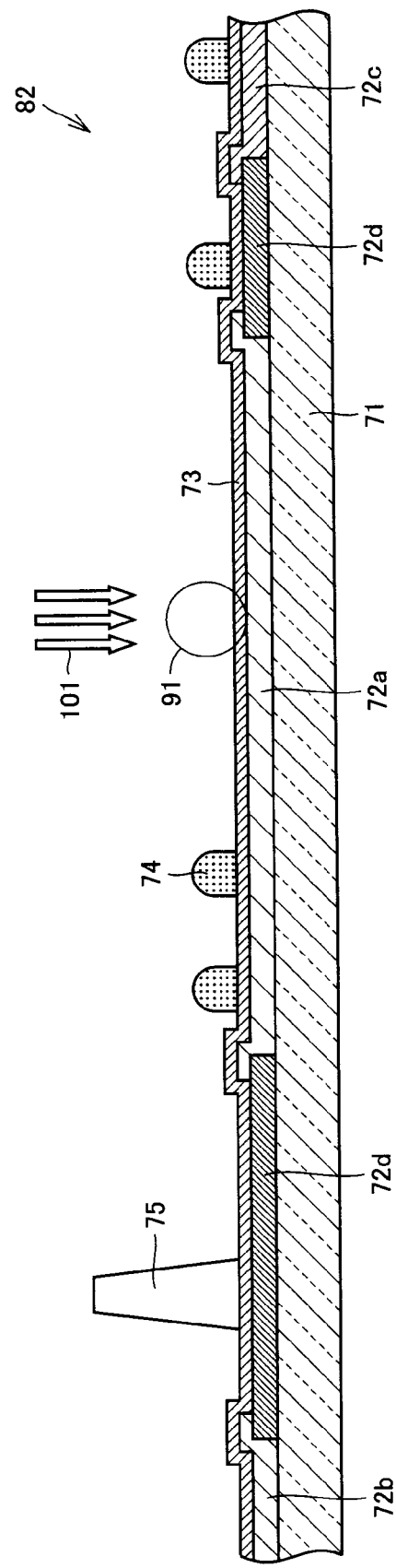
FIG. 2 is a cross section along line II-II indicated by the arrow in FIG. 1.

The steps through which the color filter substrate in the state as shown in FIG. 1 is manufactured preferably are identical to those of the conventional art and therefore, the description thereof will not be repeated. A cross section along line II-II indicated by the arrow in FIG. 1 is shown in FIG. 2. As to alignment control protrusion 74 and photo spacer 75, any of them may be formed first. However, if photo spacer 75 that is larger in height than alignment control protrusion 74 is formed first, application of a liquid resin used when the spin coat is performed for forming alignment control protrusion 74 could be hindered. Therefore, it is desirable that formation of alignment control protrusion 74 precedes formation of photo spacer 75.

Figure 3:
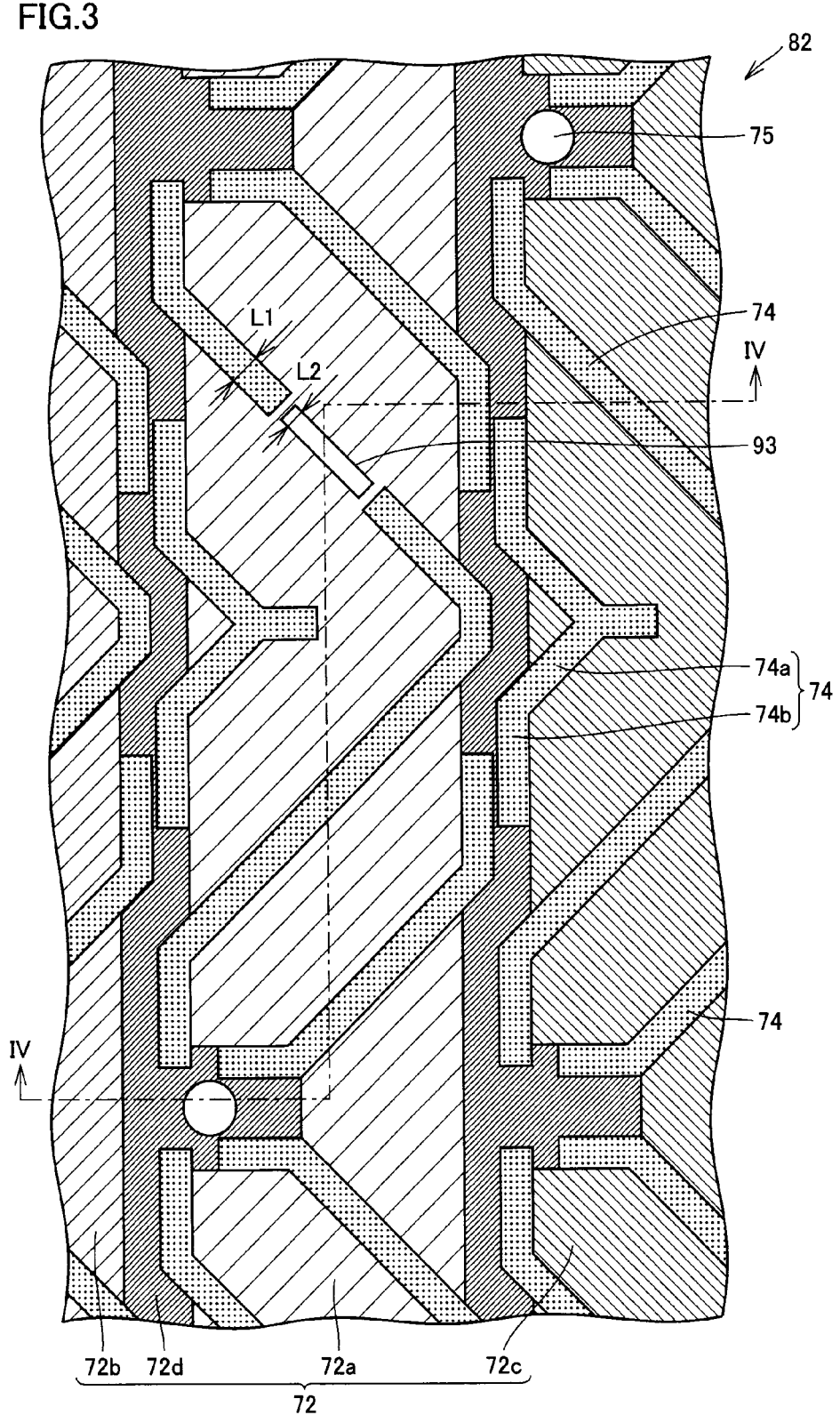
FIG. 3 is a partial plan view of the color filter substrate after defect correction according to the first preferred embodiment of the present invention.
Figure 4:
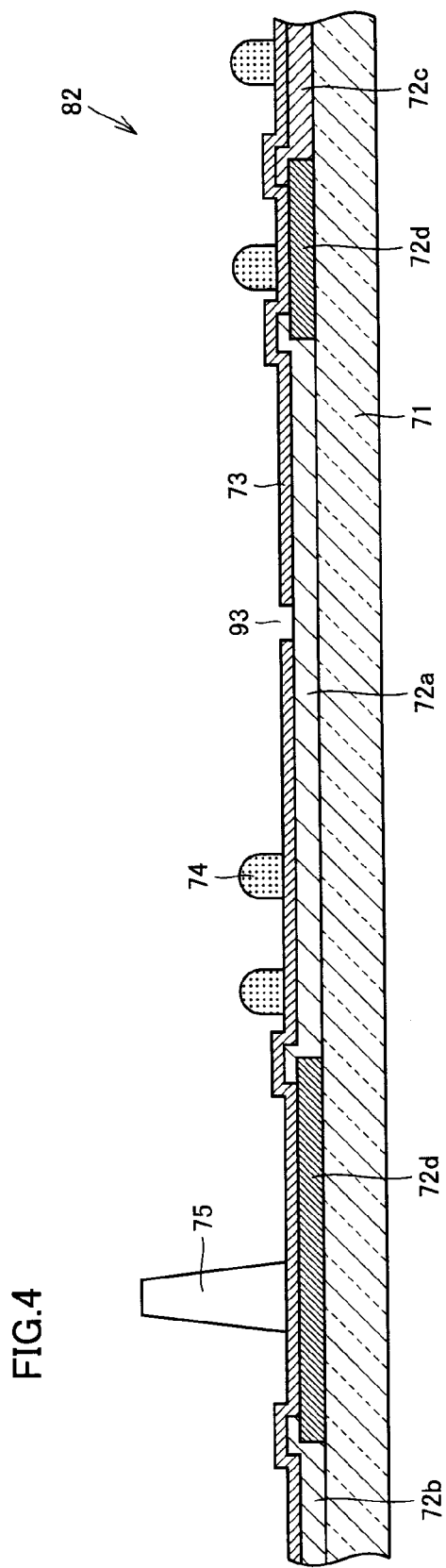
FIG. 4 is a cross section along line IV-IV indicated by the arrow in FIG. 3.

In the step of forming alignment control protrusion 74, a defect such as a remaining film or a partial absence of alignment control protrusion 74 could occur due to dust attached to or a scratch in a photomask used in an exposure step or due to foreign matter caught in an application step. FIGS. 1 and 2 show the state where a partial absence occurs. Specifically, an absent portion 91 is generated at a certain portion of alignment control protrusion 74. In the case where such an absent portion 91 of alignment control protrusion 74 occurs, a region of counter electrode 73 that corresponds to absent portion 91, namely, the portion of counter electrode 73 exposed under absent portion 91 is irradiated with light of laser 101 as shown in FIG. 2. As laser 101, YAG (Yttrium Aluminum Garnet) laser is preferably used. In this way, as shown in FIGS. 3 and 4, a substantially rectangular opening 93 is formed in the portion of counter electrode 73 under absent portion 91. FIG. 4 is a cross section along line IV-IV indicated by the arrow in FIG. 3. FIGS. 3 and 4 show the state after defect correction. In the present preferred embodiment, the alignment control protrusion preferably has a line width L1 of about 12 μm and opening 93 is formed with a line width L2 of about 10 μm, for example. As the wavelength of the laser light of the YAG laser as used, the fourth harmonic (wavelength: 266 nm) which is a short wavelength in the ultraviolet region is used. In this way, the counter electrode which is a transparent electrode made, for example, of ITO can be removed by melting while minimizing damage to the underlying layer (colored layer).

The removal of the counter electrode film by the laser irradiation is easier than the photolithography, for example, and requires a smaller number of manufacturing steps and a lower manufacturing cost. As laser 101, the YAG laser is used here. Instead of this, such a laser as diode laser, semiconductor laser, He—Ne laser, carbon dioxide gas laser, or excimer laser may be used. If laser 101 is a YAG laser, the irradiation may be performed by a laser source mounted on a laser repair device used in the usual manufacturing process of a liquid crystal display device substrate. Therefore, without requiring an additional dedicated device for the correction, defects can be repaired easily.

When the color filter substrate and other parts are assembled into the liquid crystal display device and the device is actually used, a fringe field is generated near opening 93 of counter electrode 73. The fringe field has its alignment regulating force equivalent to the tilt alignment of the liquid crystal at the tilted portion of alignment control protrusion 73 in the case where alignment control protrusion 73 is normally present. Therefore, liquid crystal molecules can be aligned in a state close to the state where alignment control protrusion 73 is present. Thus, when an image is displayed by the liquid crystal display device, alignment failure hardly occurs in a pixel where partial absence of the alignment control protrusion occurs.

Opening 93 of counter electrode 73 may be formed to have a substantially rectangular shape and a length (line width) L2 of the shorter side of about 3 μm to about 20 μm, which is more preferably about 5 μm to about 20 μm, so that a fringe field having a sufficient alignment regulating force on the liquid crystal can be formed. In the present preferred embodiment, line width L2 is about 10 μm which meets the preferred condition.

In the present preferred embodiment, alignment control protrusion 74 has a substantially rectangular pattern or line-shaped pattern with a certain line width as shown in FIGS. 1 and 2. Further, opening 93 is also substantially rectangular as shown in FIG. 3. The protrusion and opening, however, are not limited to the above-described ones. The pattern of the alignment control protrusion as seen in plan view may be a shape of a combination of a polygon such as triangle or pentagon, a semi-circle and a circle, for example. As to the opening formed in the electrode at the portion where the alignment control protrusion is partially absent, the opening may be shaped similarly to the absent portion of the alignment control protrusion. For example, if the alignment control protrusion is circular and the absent portion thereof is also circular, the opening formed in the electrode may be shaped similarly to the absent portion by adjusting an irradiation slit pattern, for example, of a laser repair device so that the opening formed in the electrode is also circular.

Second Preferred Embodiment

Figure 5:
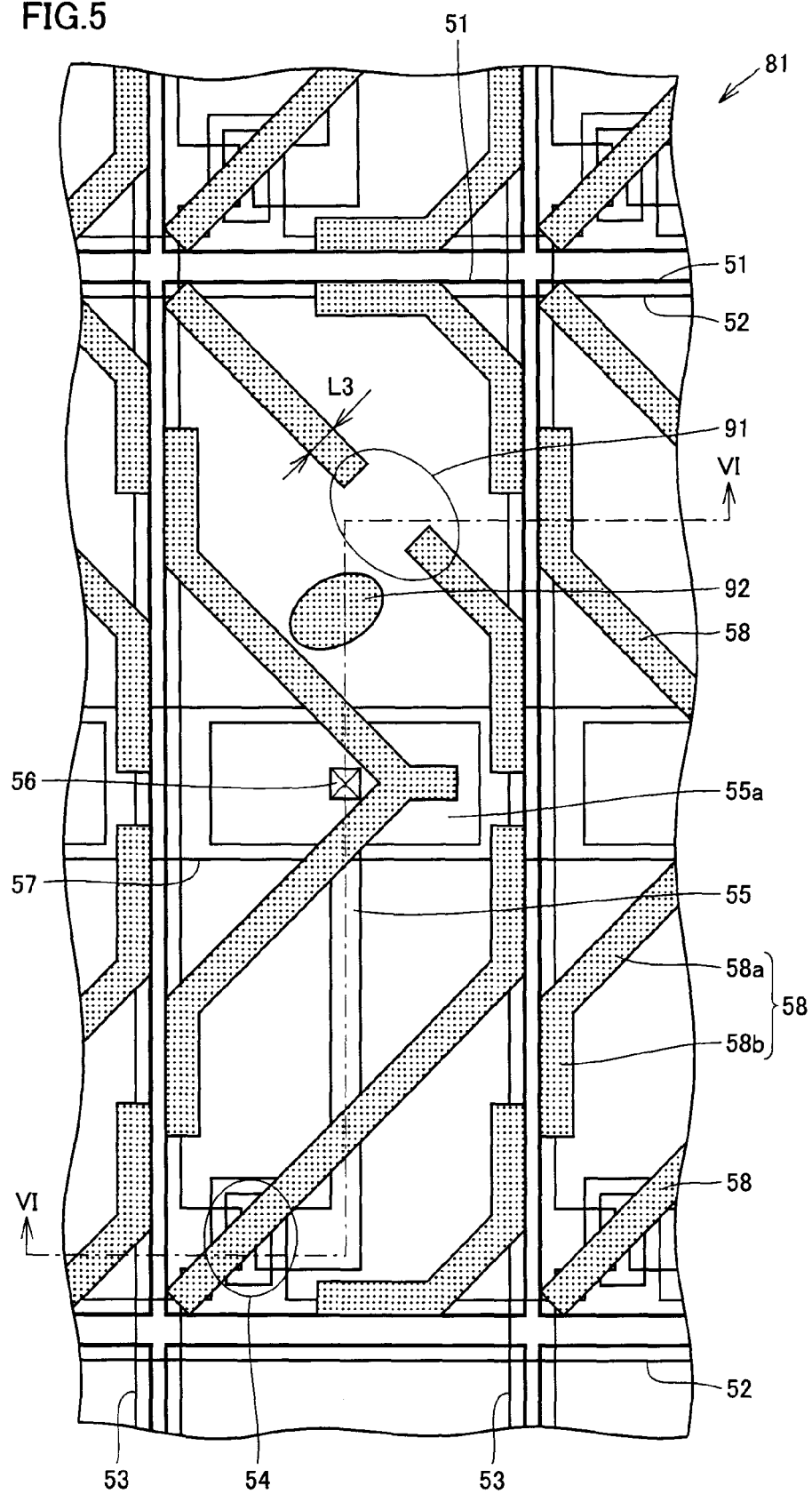
FIG. 5 is a partial plan view of an active matrix substrate before defect correction according to a second preferred embodiment of the present invention.
Figure 6:
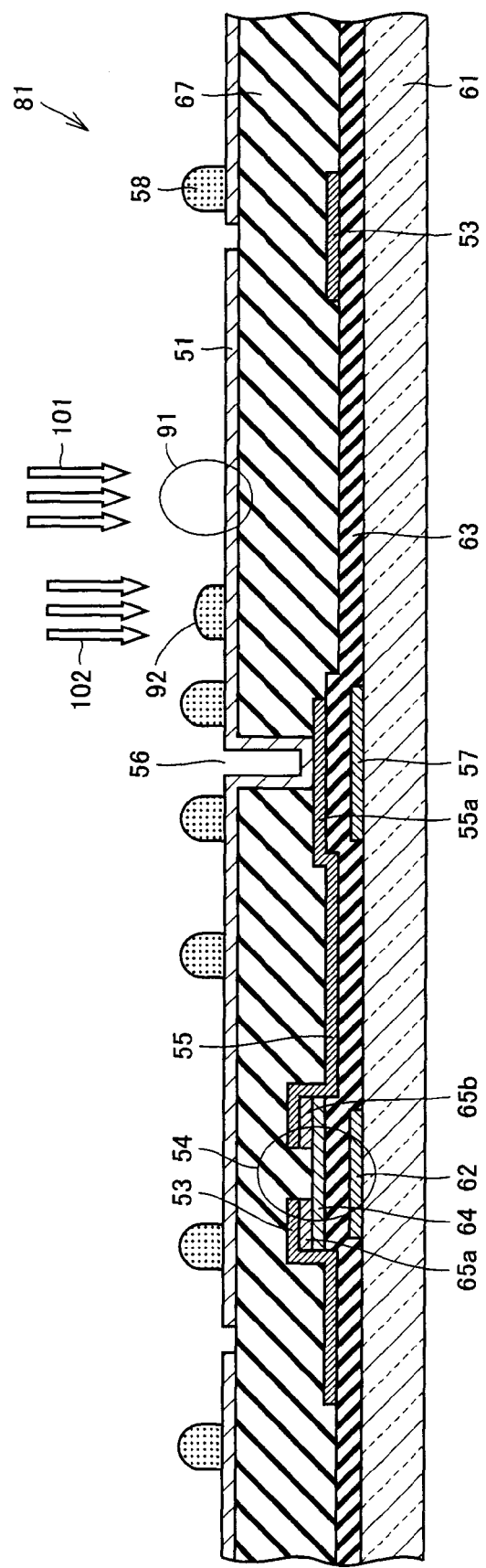
FIG. 6 is a cross section along line VI-VI indicated by the arrow in FIG. 5.

Referring to FIGS. 5 to 8, a description will be given of a method of manufacturing a substrate for a liquid crystal display device according to a second preferred embodiment of the present invention. Regarding the present preferred embodiment, the description will be given of a method of manufacturing an active matrix substrate as an example. FIG. 5 shows a plan view of active matrix substrate 81 before defect correction. At active matrix substrate 81, pixel electrodes 51 are arranged. TFT 54 is provided correspondingly to each pixel electrode 51. In FIG. 5, for the sake of convenience of description, elements that are located at different positions in the direction perpendicular to the sheet of the drawing are shown all together so that they are visible. At an upper surface of pixel electrode 51, alignment control protrusion 58 is disposed. The steps through which active matrix substrate 81 in the state as shown in FIG. 5 is manufactured are identical to those of the conventional art and therefore, the description thereof will not be repeated. A cross section along line VI-VI indicated by the arrow in FIG. 5 is shown in FIG. 6.

In the step of forming alignment control protrusion 58, a defect such as a remaining film or partial absence of alignment control protrusion 58 could occur due to dust or scratch attached to or made in a photomask used in an exposure step or due to a foreign matter caught in an application step. FIGS. 5 and 6 show that both of the partial absence and the remaining film occur. Specifically, an absent portion 91 occurs at a portion of alignment control protrusion 58, and a remaining film portion 92 occurs at a region where alignment control protrusion 58 should not be present. In the case where absent portion 91 and remaining film portion 92 thus occur, a region of pixel electrode 51 corresponding to absent portion 91, namely, pixel electrode 51 exposed under absent portion 91 is irradiated with light of laser 101. Remaining film portion 92 is irradiated with light of laser 102. Lasers 101, 102 as used are both YAG lasers. Any of the laser irradiation for the absent portion and that for the remaining film may be performed first.

Figure 7:
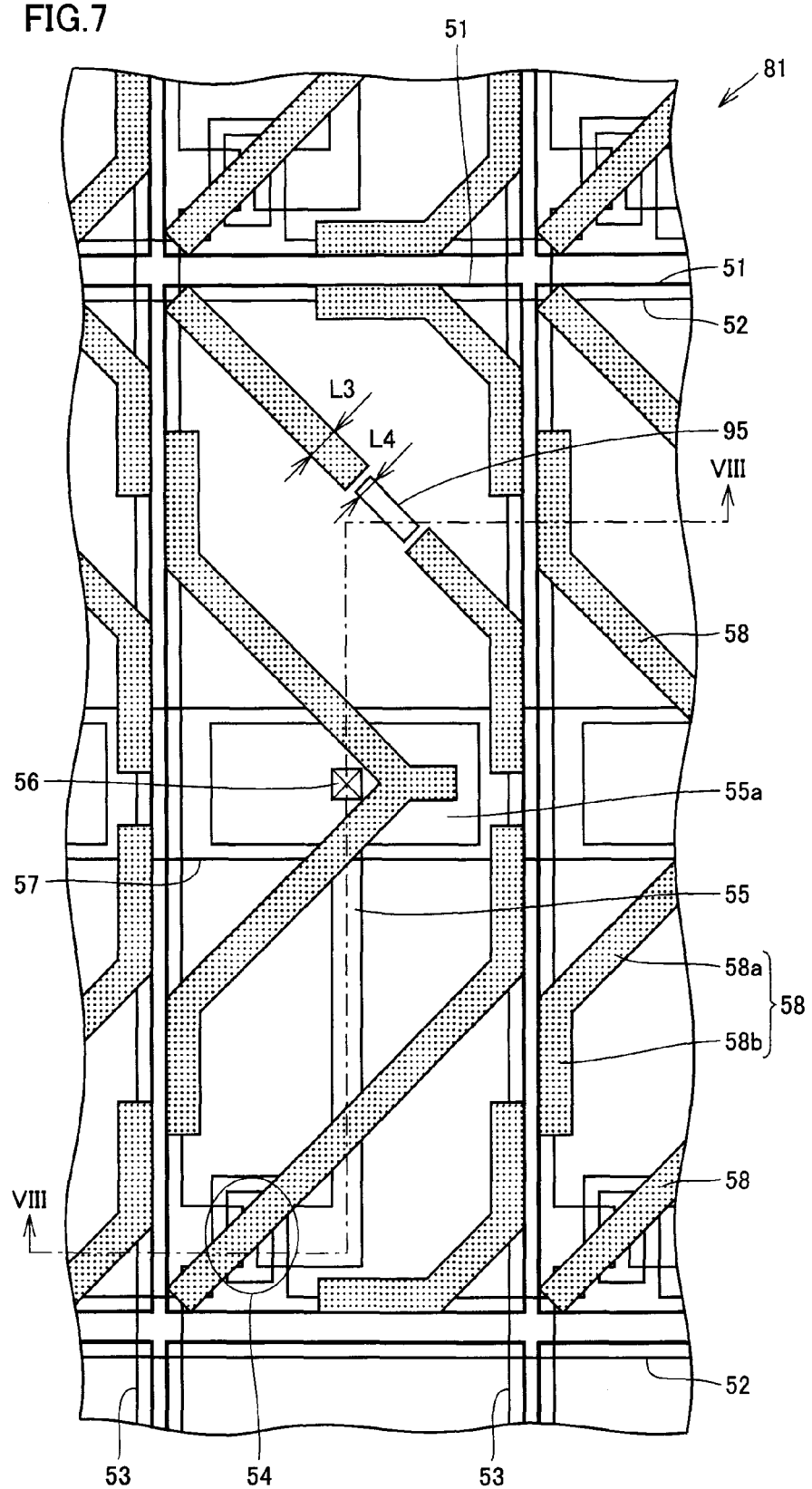
FIG. 7 is a partial plan view of the active matrix substrate after defect correction according to the second preferred embodiment of the present invention.
Figure 8:
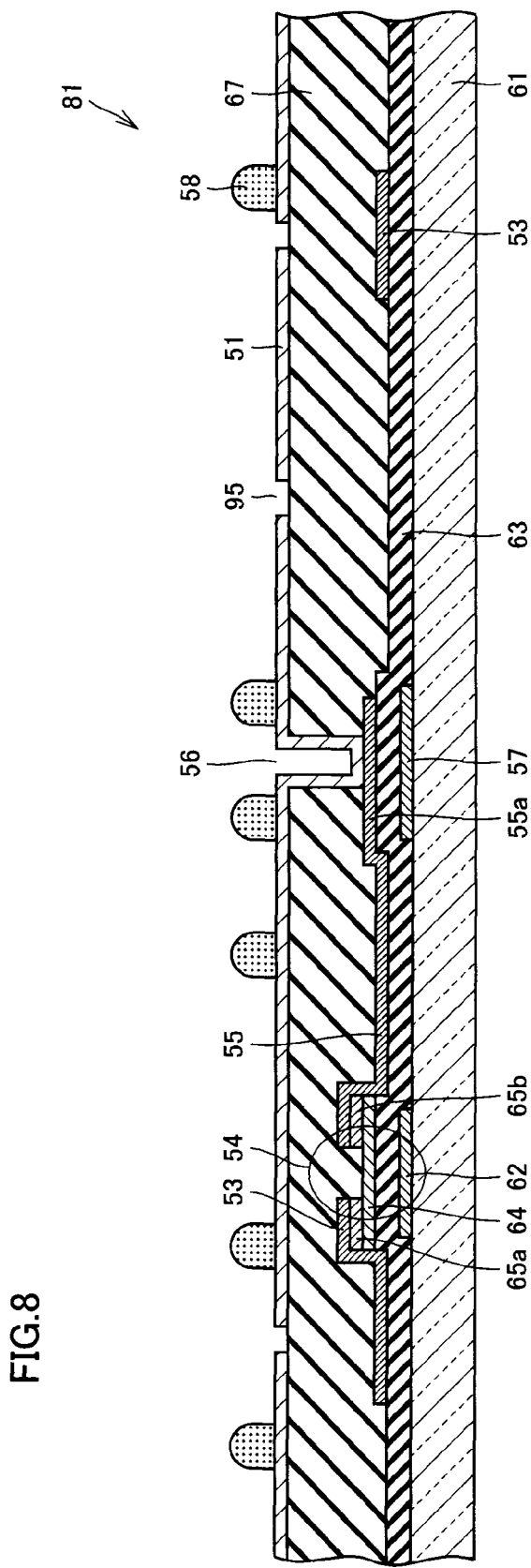
FIG. 8 is a cross section along line VIII-VIII indicated by the arrow in FIG. 7.

In this way, as shown in FIGS. 7 and 8, a substantially rectangular opening 95 is formed in pixel electrode 51 at a portion under absent portion 91. Remaining film portion 92 in FIGS. 5 and 6 has already been removed by melting by means of irradiation by laser 102. FIG. 8 is a cross section along line VIII-VIII indicated by the arrow in FIG. 7. FIGS. 7 and 8 show a state after defect correction. In the present preferred embodiment, the alignment control protrusion has a line width L3 of about 9 µm and opening 95 is formed to have a line width L4 of about 7 µm.

Opening 95 in pixel electrode 51 is formed to be substantially rectangular and have a length (line width) L4 of the shorter side of about 3 µm to about 20 µm, which is more preferably about 5 µm to about 20 µm, and accordingly a fringe field exerting a sufficient alignment regulating force on the liquid crystal can be formed, for example. In the present preferred embodiment, line width L4 is about 7 µm and thus the preferable condition is met.

Details of the laser are similar to those described in connection with the first preferred embodiment and therefore, the description will not be repeated. When remaining film portion 92 is removed by melting, it is preferable that the irradiation is performed with a lowered output of the laser irradiation and an increased number of laser shots. This is for the following reason. In the case where remaining film portion 92 occurs adjacent to alignment control protrusion 58 of a normal pattern, namely the occurring remaining film portion 92 continues from the normal pattern as seen in plan view, the irradiation with a lower output and a larger number of laser shots can reduce edge shape damages, which occur after remaining film portion 92 is removed by melting, to the normal-pattern alignment control protrusion 58 that was in contact with remaining film portion 92. The same laser source may be used to perform laser irradiation for absent portion 91 and perform laser irradiation for remaining film portion 92. In other words, a common laser repair device using a YAG laser may be used to make corrections. In this way, both of the absent portion and the remaining film portion can be corrected in a single laser correction step. Thus, the manufacturing process can be shortened and the manufacturing cost can be reduced.

The example shown here relates to removal of the remaining film portion at the active matrix substrate. In the case where a remaining film portion occurs at the color filter substrate, the correction can be made by similarly removing the remaining portion by the laser irradiation.

In connection with the first and second preferred embodiments, a method of manufacturing a substrate for a liquid crystal display device is described above. The scope of the present invention also includes, as a method of manufacturing a liquid crystal display device according to preferred embodiments of the present invention, fabrication of a liquid crystal display device using a substrate for the liquid crystal display device obtained by performing the manufacturing method including the above described step of correcting a defect.

Third Preferred Embodiment

Figure 9:
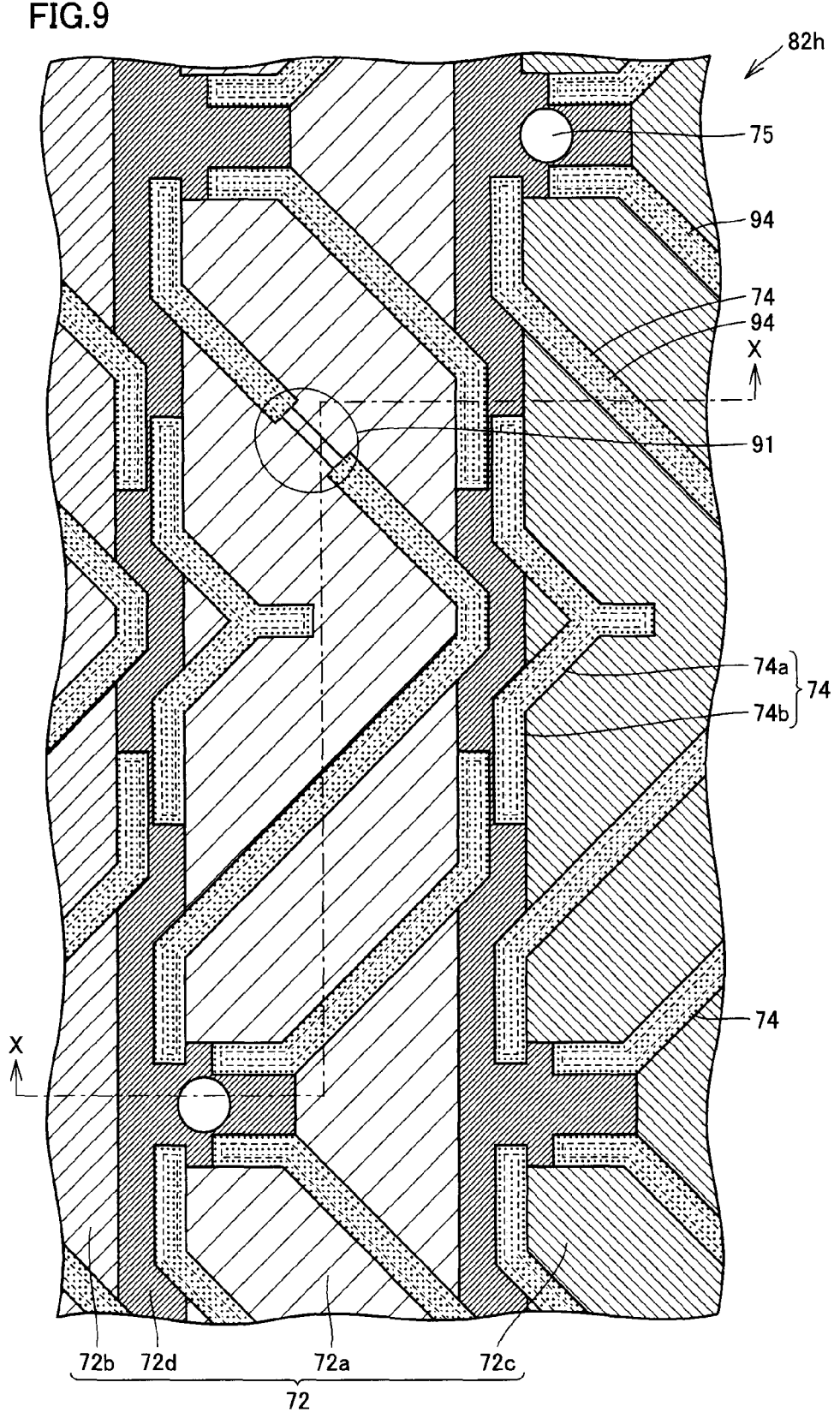
FIG. 9 is a partial plan view of a color filter substrate according to a third preferred embodiment of the present invention.
Figure 10:
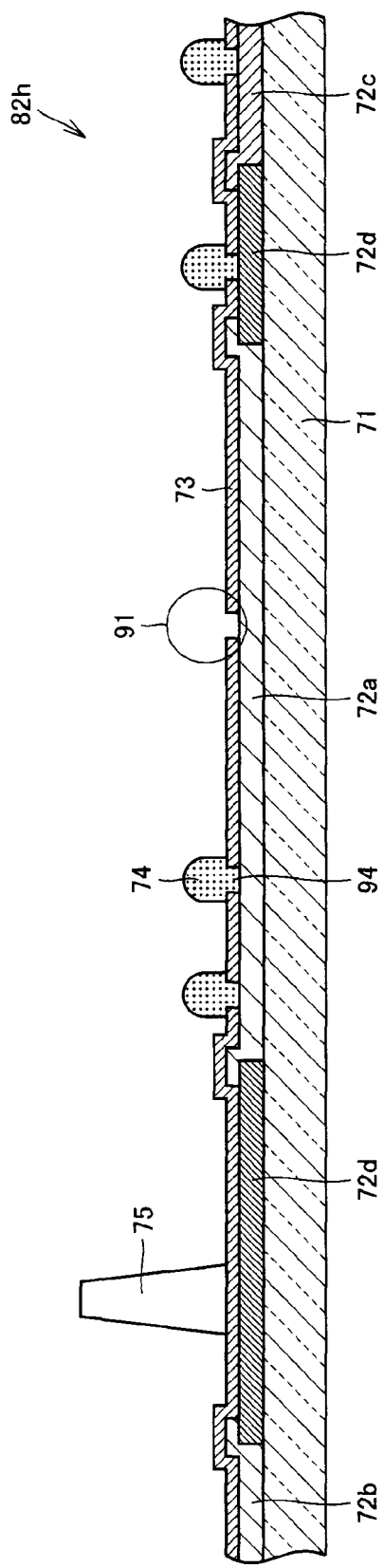
FIG. 10 is a cross section along line X-X indicated by the arrow in FIG. 9.

Referring to FIGS. 9 and 10, a description will be given of a substrate for a liquid crystal display device according to a third preferred embodiment of the present invention. In connection with the present preferred embodiment, a color filter substrate will be described as an example. A plan view of color filter substrate 82h in the present preferred embodiment is shown in FIG. 9. A cross section along line X-X indicated by the arrow in FIG. 9 is shown in FIG. 10. Color filter substrate 82h includes black matrix layer 72d disposed at a main surface to define each pixel region and function as a shield layer. Alignment control protrusion 74 includes main alignment control protrusion 74a and auxiliary alignment control protrusion 74b extending continuously from main alignment control protrusion 74a and overlap a side of black matrix layer 72d. At color filter substrate 82h, opening 94 of counter electrode 73 is provided linearly along linear alignment control protrusion 74 over an almost entire length of alignment control protrusion 74. In principle, however, opening 94 is provided in a region covered with alignment control protrusion 74. In FIG. 9, opening 94 hidden under alignment control protrusion 74 is indicted by the broken line. At this color filter substrate 82h, alignment control protrusion 74 may have absent portion 91.

Opening 94 of counter electrode 73 can be formed by the photolithography after counter electrode 73 is formed.

Color filter substrate 82h which is a substrate for a liquid crystal display device in the present preferred embodiment has opening 94 provided in advance in a region covered with alignment control protrusion 74. Therefore, even if there is an absent portion 91, opening 94 provided in advance in counter electrode 73 is exposed in the region of absent portion 91. This exposed opening 94 generates a fringe field having an alignment regulating force instead of the alignment regulating force provided by alignment control protrusion 74 of the normal pattern. Thus, in the case where this substrate for a liquid crystal display device is used to fabricate the liquid crystal display device and an image is displayed by the device, in a pixel where partial absence of the alignment control protrusion occurs, it is unlikely that alignment failure occurs.

In the present preferred embodiment as shown in FIG. 9, opening 94 is formed to extend over the almost entire length of the alignment control protrusion. However, the opening is not limited to this. For example, while there are many alignment control protrusions in FIG. 9, opening 94 may be provided only under the auxiliary alignment control protrusion formed on black matrix (BM) layer 72d. Alternatively, while there are some regions covered with alignment control protrusions, the opening of the counter electrode may be provided in advance only in a region where an absent portion of the alignment control protrusion is likely to occur in the manufacturing process.

In connection with the present preferred embodiment, the example is illustrated where opening 94 is provided only in the region covered with alignment control protrusion 74. However, the opening may extend out of the region covered with the alignment control protrusion. In other words, it is preferable for the present invention to provide at least a portion of the opening in a region covered with the alignment control protrusion.

An example of the case where the opening extends out of the region covered with the alignment control protrusion is as follows. The opening includes a trunk portion extending within the region covered with the alignment control protrusion and thin branch portions extending toward opposite sides from the trunk portion to protrude from the region covered with the alignment control protrusion. This is a slit pattern. Many branch portions may extend in parallel toward the opposite sides.

Fourth Preferred Embodiment

Figure 11:
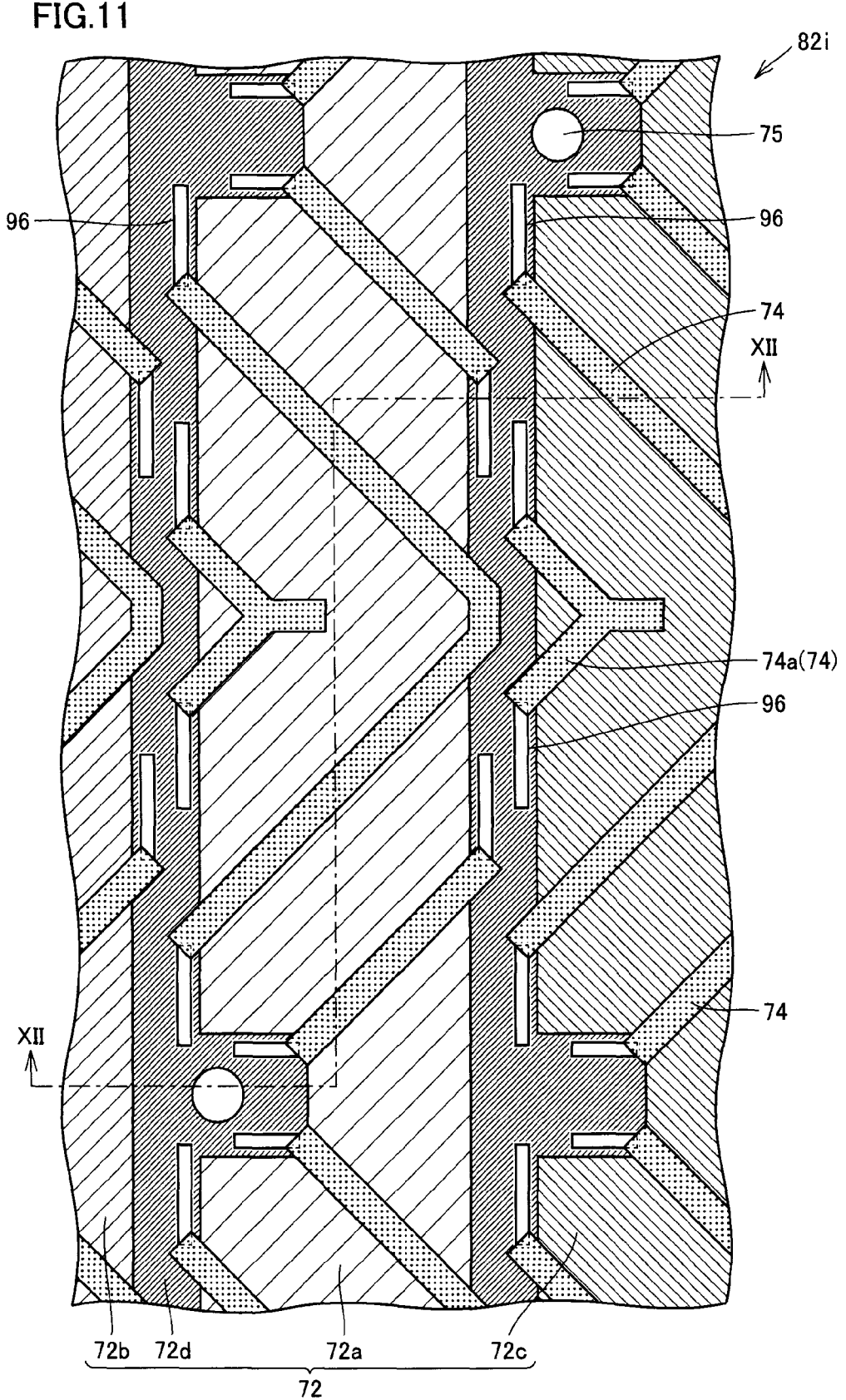
FIG. 11 is a partial plan view of a color filter substrate according to a fourth preferred embodiment of the present invention.
Figure 12:
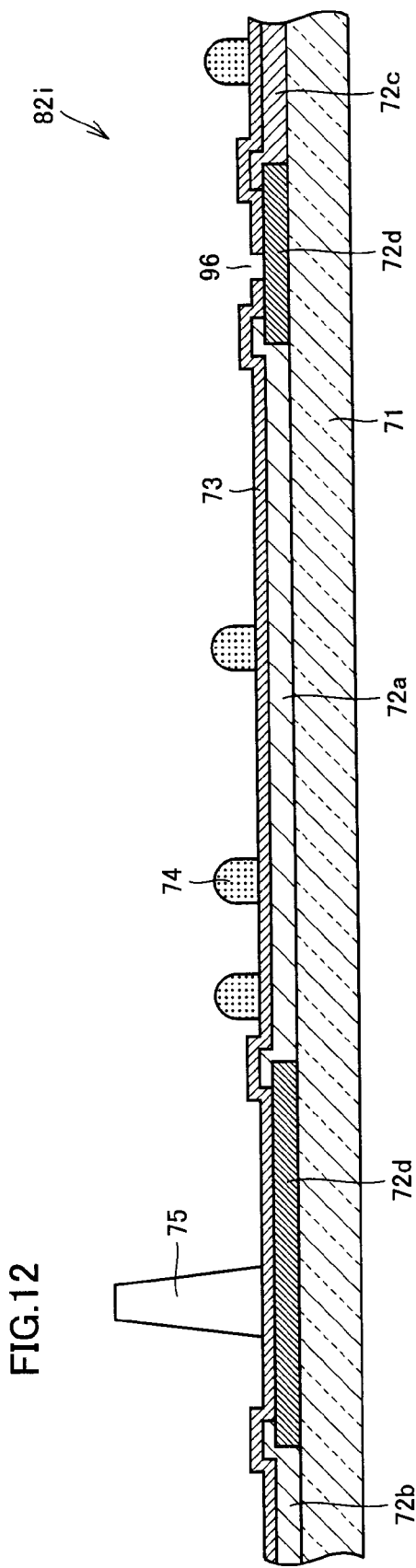
FIG. 12 is a cross section along line XII-XII indicated by the arrow in FIG. 11.
Figure 13:
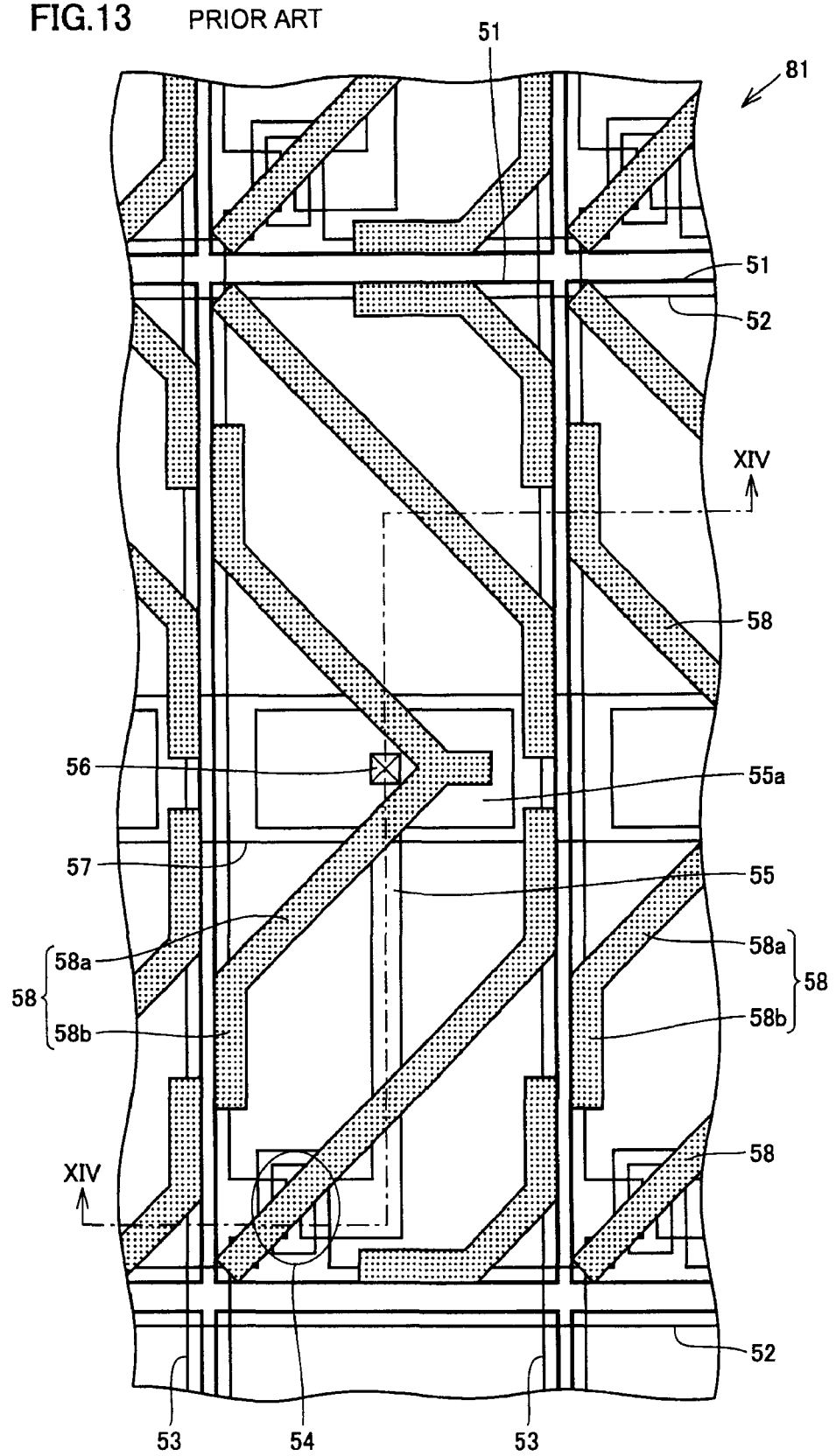
FIG. 13 is a partial plan view of a conventional active matrix substrate.
Figure 14:
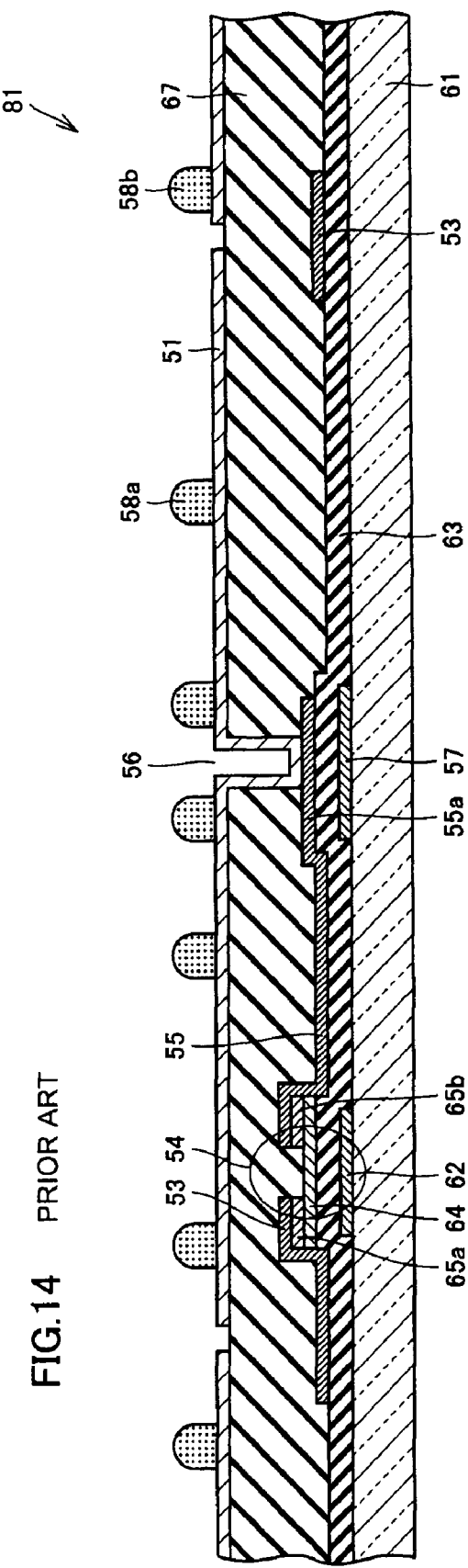
FIG. 14 is a cross section along line XIV-XIV indicated by the arrow in FIG. 13.
Figure 15:
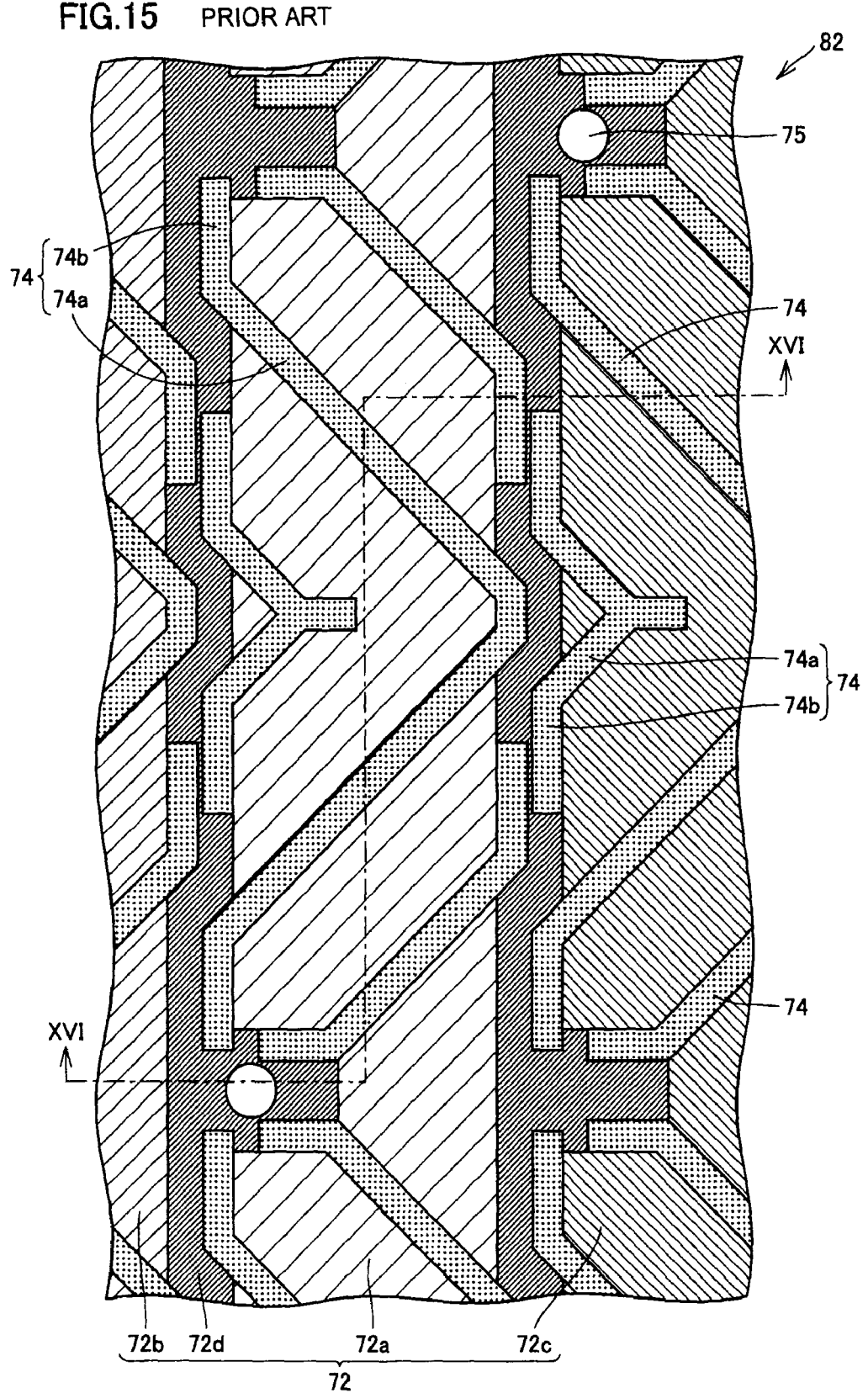
FIG. 15 is a plan view of a conventional color filter substrate.
Figure 16:
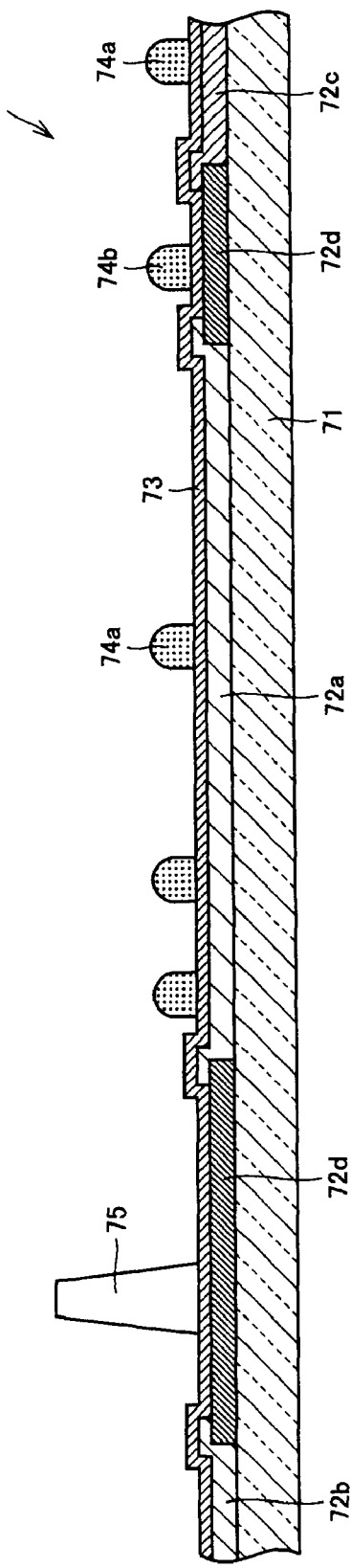
FIG. 16 is a cross section along line XVI-XVI indicated by the arrow in FIG. 15.
Figure 17:
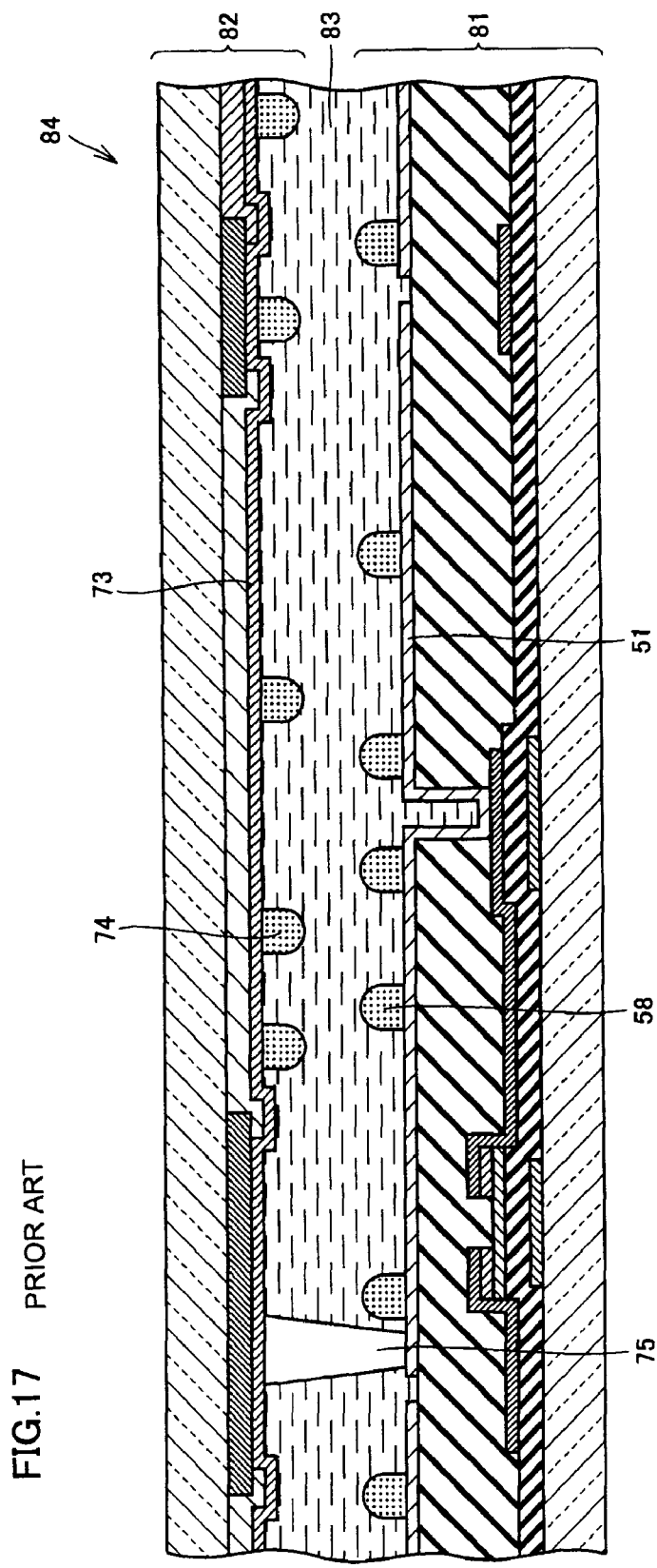
FIG. 17 is a cross section of a conventional liquid crystal display device.

Referring to FIGS. 11 and 12, a description will be given of a substrate for a liquid crystal display device according to a fourth preferred embodiment of the present invention. In connection with the present preferred embodiment, the description will be given of a color filter substrate as an example. A plan view of color filter substrate 82i in the present preferred embodiment is shown in FIG. 11. A cross section along line XII-XII indicated by the arrow in FIG. 11 is shown in FIG. 12. Color filter substrate 82i includes black matrix layer 72d arranged to define each pixel region at a main surface and to function as a shield layer. At color filter substrate 82i, alignment control protrusion 74 is provided only in the section corresponding to main alignment control protrusion 74a in the first and third preferred embodiments. In the section corresponding to auxiliary alignment control protrusion 74b in the first and third preferred embodiments, an opening 96 of counter electrode 73 is provided in linear form instead of alignment control protrusion 74. The whole opening 96 is disposed to overlap a side of black matrix layer 72d. Opening 96 has an end overlapping alignment control protrusion 74.

Opening 96 of counter electrode 73 can be formed by the photolithography after counter electrode 73 is formed.

The presence of opening 96 helps the divided alignment of liquid crystal molecules at an end of alignment control protrusion 74, and it is unlikely that an undesired domain is generated in which liquid crystal molecules are aligned in various directions. Since the alignment regulating force of opening 96 is smaller than the alignment regulating force of the alignment control protrusion, it is advantageous to provide alignment control protrusion 74 in a region where the alignment regulating force is necessary, rather than providing opening 96. Therefore, it is preferable to provide opening 96 of counter electrode 73, instead of the alignment control protrusion, in only a portion of regions where the alignment regulating force is necessary. Since it is likely that partial absence of auxiliary alignment control protrusion 74b occurs in the first and third preferred embodiments, it is desirable to provide opening 96 instead of the auxiliary alignment control protrusion.

In connection with the present preferred embodiment, the example is shown where the entire opening 96 of counter electrode 73 is disposed to overlap a side of black matrix layer 72d which functions as the shield layer and an end of opening 96 overlaps alignment control protrusion 74. The portion of the opening that overlaps a side of the black matrix layer is not limited to the entire opening. Only a portion of the opening may overlap a side of the black matrix layer. Further, the portion of the opening overlapping the alignment control protrusion is not limited to an end, and the overlapping portion may be a portion thereof. In other words, it is preferable for the present invention that at least a portion of the opening overlaps a side of the shield layer and that a portion of the opening overlaps the alignment control protrusion.

In connection with the third and fourth preferred embodiments, the description is given of the example where the liquid crystal display device substrate is a color filter substrate. However, the substrate is not limited to this. In the case where the liquid crystal display device substrate is an active matrix substrate as well, the third and fourth preferred embodiments are applicable by replacing "counter electrode" with "pixel electrode."

At the color filter substrate, the counter electrode is usually formed on the entire substrate. Therefore, the counter electrode is not patterned by the photolithography. In contrast, for the active matrix substrate, patterning is performed by the photolithography for forming a pixel electrode. When the patterning is performed for the pixel electrode, the opening which should be provided in advance under the alignment control protrusion can be formed simultaneously. It is preferable that the patterning of the pixel electrode and the formation of the opening of the pixel electrode are carried out in the same process step, so that an increase of the number of manufacturing steps can be avoided.

The scope of the present invention also includes a liquid crystal display device including the substrate for the liquid crystal display device as described in connection with the third and fourth preferred embodiments. For such a liquid crystal display device, the alignment control protrusion can be corrected by an easy method. Therefore, the liquid crystal display device can be manufactured with an improved yield and at a low cost.

The present invention is applicable to a liquid crystal display device substrate, a method of manufacturing the same and a liquid crystal display device.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A method of manufacturing a liquid crystal display device substrate comprising the steps of:
    forming the liquid crystal display device substrate so to have an electrode formed to partially cover a main surface and including a linear alignment control protrusion provided on said electrode for controlling alignment of liquid crystal; and
    forming an opening in a region of said electrode, the region corresponding to an absent portion occurring on an imaginary line extended from said linear alignment control protrusion; wherein
    in said step of forming the opening, said opening that is substantially rectangular in shape and that has a length of a shorter side of at least about 3 μm and at most about 20 μm is formed.

2. The method of manufacturing the liquid crystal display device substrate according to claim 1, further comprising the step of removing an occurring remaining film portion of said linear alignment control protrusion by laser irradiation.

3. The method of manufacturing the liquid crystal display device substrate according to claim 1, wherein said step of forming the opening is performed by laser irradiation.

4. The method of manufacturing the liquid crystal display device substrate according to claim 3, wherein a YAG laser is used for said laser irradiation.

5. A method of manufacturing a liquid crystal display device substrate as recited in claim 1, further comprising the step of forming said opening by photolithography.

6. A method of manufacturing a liquid crystal display device comprising the steps of:
    forming a liquid crystal display device substrate so to have an electrode formed to partially cover a main surface and including a linear alignment control protrusion provided on said electrode for controlling alignment of liquid crystal;
    forming an opening in a region of said electrode, the region corresponding to an absent portion occurring on an imaginary line extended from said linear alignment control protrusion; and
    completing manufacturing of the liquid crystal display device; wherein
    in said step of forming the opening, said opening that is substantially rectangular in shape and that has a length of a shorter side of at least about 3 μm and at most about 20 μm is formed.

7. A method of manufacturing a liquid crystal display device substrate as recited in claim 6, further comprising the step of forming said opening by photolithography.

8. A liquid crystal display device substrate comprising:
a substrate having a main surface;
a pixel electrode arranged to cover each pixel region defined on said main surface; and
an alignment control protrusion arranged on said pixel electrode so as to control alignment of liquid crystal; wherein
said pixel electrode has an opening;
at least a portion of said opening is located in a region covered with said alignment control protrusion; and
said alignment control protrusion includes a main alignment control protrusion and an auxiliary alignment control protrusion extending to overlap a side of said pixel electrode, and said opening is provided in a region covered with said auxiliary alignment control protrusion.

9. A liquid crystal display device comprising a liquid crystal display device substrate as recited in claim 8.

10. A liquid crystal display device substrate comprising:
a substrate having a main surface;
a counter electrode located at said main surface;
a shield layer disposed to define each pixel region at said main surface; and
an alignment control protrusion arranged on said counter electrode so as to control alignment of liquid crystal; wherein
said counter electrode has an opening;
at least a portion of said opening is located in a region covered with said alignment control protrusion; and
said alignment control protrusion includes a main alignment control protrusion and an auxiliary alignment control protrusion extending to overlap a side of said shield layer, and said opening is provided in a region covered with said auxiliary alignment control protrusion.

11. The liquid crystal display device substrate according to claim 10, further comprising a shield layer disposed to define each pixel region at said main surface, wherein said opening has at least a portion overlapping a side of said shield layer, and said portion of said opening overlaps said alignment control protrusion.

12. A liquid crystal display device comprising a liquid crystal display device substrate as recited in claim 10.

* * * * *